United States Patent Office 3,218,206
Patented Nov. 16, 1965

3,218,206
HEAT HARDENED PENTAERYTHRITOL-ACROLEIN ROCKET PROPELLANT GRAINS AND THEIR PRODUCTION
Ely Balgley, Dearborn, Mich., assignor, by mesne assignments, to Tenneco Chemicals, Inc., a corporation of Delaware
No Drawing. Filed Sept. 15, 1958, Ser. No. 760,829
21 Claims. (Cl. 149—19)

This invention relates to rocket propellant grains. More specifically it relates to rocket propellant grains having as fuel and binder a pentaerythritol-acrolein resin.

Rocket propellant grains consist essentially of a fuel, a compound having high oxidizing capacity which hereinafter will be called "oxidizer," and a binder. In propellant grains it has been found desirable to have an organic resin serve as both fuel and binder. While many different types of organic resins including phenolic, acrylic, cellulosic, polyester, polyethylene, polyurethane, and polyvinyl resins have been used as the binder-fuel for rocket propellants, none of these when combined with an oxidizer forms satisfactory propellant grains; that is, none of them forms propellant grains that combine excellent combustion characteristics with the mechanical strength and other properties required in this application. Phenolic resins, for example, have fair combustion characteristics but form a grain that is too brittle to withstand the shocks ordinarily encountered during shipment as well as those encountered during firing.

I have found that rocket propellant grains that contain pentaerythritol-acrolein resin as the binder-fuel meet the requirements that have been established for propellant grains. They are highly flammable and burn rapidly and evenly to form large quantities of low-molecular weight gaseous products and negligible amounts of non-volatile products which could interfere with the continued burning of the grain. The propellant grains of this invention have sufficient strength to withstand rough handling prior to firing and do not crack or disintegrate under the high temperature and impact conditions encountered during the firing operations. These grains are also capable of standing temperatures as low as −65° F. and as high as 135° F. for prolonged periods of time.

Pentaerythritol and acrolein can be reacted under acidic conditions to produce synthetic resins. The resinification takes place in two stages: in the first stage pentaerythritol and acrolein react to form a prepolymer, which is essentially a mixture of monoallylidenepentaerythritol and diallylidenepentaerythritol; in the second stage the prepolymer is cured in the presence of an acidic condensation catalyst to form a hard resin. The acetalization reaction occurring in the first stage takes place in the presence of an acidic catalyst substantially in accordance with the following equations to form an aqueous solution of the prepolymer:

(1)
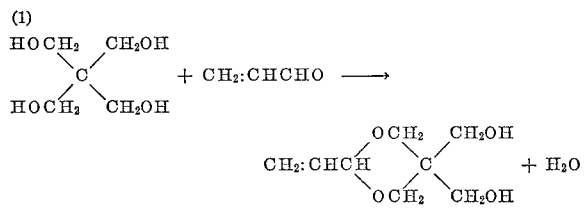

(1)
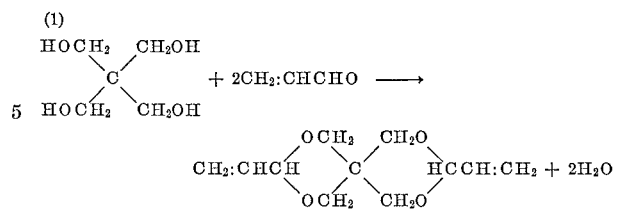

The mixture of monoallylidenepentaerythritol and diallylidenepentaerythritol produced in the first stage will be hereinafter referred to as "prepolymer" or "pentaerythritol-acrolein prepolymer."

In the second stage and after dehydration to remove the water formed during the first stage and at least most of any unreacted acrolein, the prepolymer is cured in the presence of an acidic condensation catalyst. In this curing stage the monoallylidenepentaerythritol and diallylidenepentaerythritol react with monoallylidenepentaerythritol and pentaerythritol, if any unreacted pentaerythritol is present, to form a hard resin. While the reactions taking place during the second or curing stage are not fully understood, apparently both polymerization and condensation reactions take place with crosslinking resulting from the reaction of the hydroxyl groups with the unsaturated portion of the acetal molecule.

To form on curing a resin having satisfactory mechanical properties, the prepolymer must contain some monoallylidenepentaerythritol. The maximum amount of acrolein which can be reacted with pentaerythritol in the first stage is therefore somewhat less than 2 moles of acrolein per mole of pentaerythritol. The minimum amount of acrolein is about one mole per mole of pentaerythritol, an amount which will produce a prepolymer containing monoallylidenepentaerythritol, diallylidenepentaerythritol, and some unreacted pentaerythritol. I prefer to react about 1.2–1.8 moles of acrolein with each mole of pentaerythritol.

The prepolymers are prepared by reacting pentaerythritol with acrolein in the presence of an acid condensation catalyst and in an atmosphere of an inert gas at a temperature of approximately 60°–95° C. for 1 to 4 hours.

While p-toluenesulfonic acid is a preferred catalyst for this reaction, other acidic condensation catalysts, such as oxalic acid, hydrochloric acid, phosphoric acid, boron trifluoride, and the like may also be used. The prepolymer is dehydrated under reduced pressure and neutralized with a basic compound, such as sodium acetate or sodium hydroxide, to form a stable prepolymer that will not polymerize on storage.

The neutralized prepolymer may be cured by heating it in the presence of an acidic condensation catalyst until a solid resin is obtained. The cured pentaerythritol-acrolein resins are light-colored, hard resins that have excellent mechanical and electrical properties. These resins are readily combustible and burn rapidly and evenly to form large quantities of gaseous products.

The rocket propellant grains of this invention are prepared by combining a pentaerythritol-acrolein prepolymer with an oxidizer and curing the mixture in a mold in the presence of an acidic condensation catalyst to form a pentaerythritol-acrolein resin containing the oxidizer. In these propellant grains the pentaerythritol-acrolein resin serves as a fuel as well as the binder for the oxidizer. The oxidizer is a material that contains sufficient readily available oxygen to support combustion of the fuel.

A wide variety of oxidizers may be used in combination with pentaerythritol-acrolein resins to form the propellant grains of this invention. These include inorganic salts as well as organic compounds. Among the inorganic salts useful as oxidizers are a number of nitrate, picrate, and perchlorate salts, for example, sodium nitrate, potassium nitrate, guanidine nitrate, ammonium nitrate, sodium perchlorate, potassium perchlorate, ammonium perchlorate, guanidine perchlorate, sodium picrate, guanidine picrate, and ammonium picrate. A number of organic compounds have also proven useful as oxidizers in the rocket propellant grains of this invention. These include, for example, nitrated hydrocarbons, nitrated polyhydric compounds, and nitrated waxes. The following are some of the organic compounds that may be used as oxidizers in pentaerythritol-acrolein resin-based rocket propellant grains: nitroethanes, nitrobutanes, nitrobenzenes, nitrotoluenes, nitroxylenes, nitronaphthalenes, nitrocellulose, nitroglycerine, erythritol nitrate, pentaerythritol tetranitrate, mannitol, and sorbitol nitrate. Mixtures of these compounds, for example, a mixture of two or more inorganic salts or a mixture of an inorganic salt and an organic nitrate, may also be used as the oxidizer for the fuel in these rocket propellants.

The rocket prepellant grain should contain sufficient oxidizer to produce the oxygen required for the complete combustion of the fuel. In most cases approximately stiochiometeric amounts of fuel and oxidizer are employed. A small excess of either ingredient may, however, be used if desired. The oxidizer may constitute from approximately 50% to 90% of the propellant grain, with 70% to 90% most often used. The amount present is dependent largely upon the molecular weight of the oxidizer and upon its content of readily available oxygen.

The oxidizer used in the rocket propellant compositions of this invention is added to the prepolymer as a finely-divided powder. The size of the particles of oxidizer employed is in each case dependent upon the specific oxidizer being used, the rate of combustion that is desired, the presence of various additives in the composition, and other factors that are well known to one skilled in the art. For most purposes particles ranging in size from about 25 microns to 1000 microns are satisfactory. It is to be understood, however, that the particle size of the oxidizer is not critical and that this invention is not to be limited to the use of an oxidizer of a particular particle size.

Additional materials may be added to modify the properties of the pentaerythritol-acrolein resin-based rocket propellant grains. Other fuels may be combined with the pentaerythritol-acrolein prepolymer before the addition of the oxidizer. For example, such flexible resins as polysulfides, polyvinyl resins, polyesters, and polyurethane resins may be added to modify the combustion characteristics of the propellant grain and to improve its mechanical strength. The addition of trimethylolethane, trimethylolpropane, or sorbitol to the prepolymer also results in products having improved properties.

The pentaerythritol-acrolein prepolymer and oxidizer are mixed together thoroughly to disperse the oxidizer particles uniformly throughout the resin and to prevent agglomeration of the oxidizer particles. The neutralized and dehydrated prepolymers prepared by the above-described procedure are syrupy liquids. To facilitate the incorporation of the oxidizer into the resin and at the same time to bring about an improvement in the flexibility of the cured resin, a platicizer, such as a liquid polyhydric compound or an ester, may be added to the prepolymer either prior to or concurrently with the addition of the oxidizer. These plasticizers, which bring about an appreciable reduction in the viscosity of the prepolymer, include, for example, ethylene glycol, glycerol, dibutyl phthalate, dioctyl phthalate, and liquid pentaerythritol-fatty acids esters and are used to the extent of about 5% to 25%, preferably 10% to 20%, based on the weight of the prepolymer. The addition of less than 5% of plasticizer has little or no effect on the viscosity of the prepolymer. The presence of more than approximately 25% may have a detrimental effect on the mechanical properties of the propellant grain.

An alternate method of reducing its viscosity involves the heating of the prepolymer to approximately 40° C. before the oxidizer is added.

After the pentaerythritol-acrolein prepolymer has been intimately mixed with the oxidizer, an acidic condensation catalyst is added, and the mixture is poured into a mold and cured. The acidic condensation catalyst may be the same as that used in preparing the prepolymer or it may be different one. The curing, or conversion of the prepolymer to a solid resin, is generally accomplished by heating the prepolymer-oxidizer-catalyst mixture at 55°–90° C. until a solid resin is obtained. The time required for the curing depends upon the temperature employed, the acid catalyst chosen, the prepolymer content of the mixture, and other factors.

During the curing step the compositions of this invention, unlike those based on phenolic and other synthetic resins, undergo very little shrinkage, deformation, or warping but rather retain the size and shape of the mold cavity. The dimensional stability demonstrated by the pentaerythritol-acrolein propellent grains on curing is a desirable and important feature of this invention because it makes possible the preparation of propellant grains that fit tightly into the rocket motor, thus providing a maximum amount of fuel for the rocket, improving the strength of the propellant grain, and minimizing vibrations in the rocket during flight. The term "grain" is used herein to refer to propellant bodies without regard to their size; for example, it refers to particles a few microns in diameter as well as to those that are several feet in their largest dimension. The propellant grains are generally formed to a predetermined shape, but it is not necessary that they be shaped.

The invention is illustrated by the examples that follow. It should be understood, however, that the examples are given by way of illustration only and that the invention is not to be limited by the details set forth therein.

*Example 1*

A pentaerythritol-acrolein prepolymer was prepared in a flask equipped with a reflux condenser, agitator, and means for flowing nitrogen into the flask. A mixture of 2448 grams (18 moles) of pentaerythritol, 1680 grams (30 moles) of technical grade acrolein, 13.5 grams of p-toluenesulfonic acid monohydrate, and 1.68 grams of hydroquinone was placed in the flask. The hydroquinone was added as an inhibitor to prevent polymerization of the acrolein during the reaction. The mixture was gradually heated over a period of 10 minutes to a reflux temperature of 48° C. Heating was continued, and after 30 minutes the reflux temperature was 70° C. The mixture was then heated at 70°–75° C. for 2 hours. The resulting aqueous solution was neutralized by the addition of sufficient 30% sodium hydroxide solution to raise its pH to 6.5. The solution was filtered and then heated at 40°–50° C. under an absolute pressure of 120 mm. until about 600 ml. of distillate had been collected. The solution was then heated at 80° C. at an absolute pressure of 10–20 mm. for an hour to remove the remainder of the water and unreacted acrolein. The dehydrated prepolymer, which weighed 3352 grams, was a syrupy liquid that had a hydroxy content of 9.0%, an iodine number of 117, and a molecular weight of 332. It was stable and could be stored indefinitely without polymerization or decomposition.

This stable prepolymer or one prepared in substantially the same way was used in the preparation of the rocket propellant grains as described in the following examples.

*Example 2*

A mixture of 180 grams of the prepolymer whose preparation was described in Example 1 and 1020 grams of finely-divided ammonium perchlorate was placed in a mill and mixed until the particles of ammonium perchlorate were uniformly dispersed throughout the plastic mass. Then 3.6 grams of p-toluenesulfonic acid dissolved in 9 ml. of methanol was added and after stirring the catalyzed prepolymer-oxidizer mass was cast in a mold and cured at 75° C. for 12 hours. The product was a light-colored, hard resin which had good mechanical strength and which burned rapidly and evenly to form large amounts of gases and only small amounts of non-volatile products.

*Example 3*

The prepolymer of Example 1 (120 grams) was mixed with 12 grams of ethylene glycol to form a non-viscous, free-flowing solution. Then 1068 grams of finely-divided potassium perchlorate was added, and the resulting mixture was mixed in a mill until the particles of potassium perchlorate were uniformly dispersed throughout the plastic mass. After the addition of a solution of 3.2 grams of p-toluenesulfonic acid in 9 ml. of methanol, the composition was cast in a mold and cured at 70° C. for 15 hours. The product, which had undergone very little shrinkage on curing, was a light-colored hard resin which had excellent mechanical properties and which burned evenly but somewhat more slowly than did the propellant grain whose preparation was described in Example 2.

*Example 4*

A mixture of 240 grams of the prepolymer of Example 1, 36 grams of dimethyl phthalate, 800 grams of finely-divided ammonium nitrate, and 124 grams of nitrocellulose was mixed in a mill until a uniform plastic mass was obtained. After the addition of 3.6 grams of p-toluenesulfonic acid in 9 ml. of methanol, the composition was cast in a mold and cured at 80° C. for 24 hours. The cured product was a light-colored hard resin which had excellent mechanical properties and which burned evenly but somewhat more slowly than did the propellant grain whose preparation was described in Example 2.

I claim:

1. A rocket propellant composition consisting essentially of a heat-hardened pentaerythritol-acrolein resin containing a finely-divided oxidizer selected from the group consisting of alkali metal, guanidine, and ammonium nitrate, picrate, and perchlorate and mixtures thereof; nitrated hydrocarbons; nitrated polyhydric compounds; nitrated waxes; and mixtures thereof, said oxidizer constituting from 50% to 95% by weight of the propellant composition.

2. A rocket propellant composition consisting essentially of a heat-hardened pentaerythritol-acrolein resin and finely-divided ammonium nitrate, said ammonium nitrate constituting approximately 70% to 90% of the weight of the propellant composition.

3. A rocket propellant composition consisting essentially of heat-hardened pentaerythritol-acrolein resin and finely-divided potassium perchlorate, said potassium perchlorate constituting approximately 70% to 90% of the weight of the propellant composition.

4. A rocket propellant composition consisting essentially of a heat-hardened pentaerythritol-acrolein resin and finely-divided nitrocellulose, said nitrocellulose constituting approximately 70% to 90% of the weight of the propellant composition.

5. A rocket propellant composition consisting essentially of a heat-hardened pentaerythritol-acrolein resin and pentaerythritol tetranitrate, said pentaerythritol tetranitrate constituting approximately 70% to 90% of the weight of the propellant composition.

6. A rocket propellant composition consisting essentially of a heat-hardened pentaerythritol-acrolein resin and nitrotoluene, said nitrotoluene constituting approximately 70% to 90% of the weight of the propellant composition.

7. A rocket propellant composition consisting essentially of a heat-hardened pentaerythritol-acrolein resin and ammonium perchlorate, said ammonium perchlorate constituting 70% to 90% of the weight of the propellant composition.

8. The rocket propellant composition which is the cured resinous product obtained by heating in the presence of an acid condensation catalyst a mixture of a pentaerythritol-acrolein prepolymer resulting from the condensation of pentaerythritol and 1–2 moles of acrolein per mole of pentaerythritol in the presence of an acid condensation catalyst with an oxidizer selected from the group consisting of alkali metal, guanidine, and ammonium nitrate, picrate, and perchlorate and mixture thereof; nitrated hydrocarbons; nitrated polyhydric compounds; nitrated waxes; and mixtures thereof, said oxidizer constituting approximating 50% to 95% by weight of the mixture and being present in an amount substantially equivalent stoichiometrically to the amount of prepolymer in the mixture.

9. The shaped rocket propellant grain which is the cured resinous product obtained by heating in a mold and in the presence of an acid condensation catalyst a mixture of a pentaerythritol-acrolein prepolymer resulting from the condensation of pentaerythritol and 1–2 moles of acrolein per mole of pentaerythritol in the presence of an acid condensation catalyst with an oxidizer selected from the group consisting of alkali metal, guanidine, and ammonium nitrate, picrate, and perchloroate and mixtures thereof; nitrated hydrocarbons; nitrated polyhydric compounds; nitrated waxes; and mixtures thereof, said oxidizer constituting approximately 70% to 90% of the weight of said mixture and being present in an amount substantially equivalent stoichiometrically to the amount of prepolymer in the mixture.

10. The shaped rocket propellant grain which is the cured resinous product obtained by heating in a mold and in the presence of an acid condensation catalyst a mixture of a pentaerythritol-acrolein prepolymer resulting from the condensation of pentaerythritol and 1–2 moles of acrolein per mole of pentaerythritol in the presence of an acid condensation catalyst, a plasticizer, and an oxidizer selected from the group consisting of alkali metal, guanidine, and ammonium nitrate, picrate, and chlorate and mixtures thereof; nitrated hydrocarbons, nitrated polyhydric compounds; nitrated waxes; and mixtures thereof said oxidizer constituting approximately 70% to 90% of the weight of said mixture and being present in an amount substantially equivalent stoichiometrically to the amount of prepolymer in the mixture.

11. The rocket propellant composition which is the cured resinous product obtained by heating in the presence of an acid condensation catalyst a mixture consisting essentially of 70% to 90% of ammonium perchlorate, 9% to 25% of pentaerythritol-acrolein prepolymer resulting from the condensation of pentaerythritol and 1–2 moles of acrolein per mole of pentaerythritol in the presence of an acid condensation catalyst, and 0.5% to 5% of ethylene glycol.

12. The process for producing a rocket propellant composition comprising the steps of forming an intimate mixture of a pentaerythritol-acrolein prepolymer resulting from the condensation of pentaerythritol and 1–2 moles of acrolein per mole of pentaerythritol in the presence of an acid condensation catalyst with a finely-divided oxidizer, said mixture containing the prepolymer and oxidizer in substantially stoichometrically equivalent amounts and heating said mixture in the presence of an acid condensation catalyst thereby forming a rocket propellant composition.

13. The process of producing a rocket propellant composition comprising the steps of forming an intimate mixture of a pentaerythritol-acrolein prepolymer resulting from the condensation of pentaerythritol and 1–2 moles of acrolein per mole of pentaerythritol in the presence of an acid condensation catalyst with a finely-divided oxidizer, said oxidizer being selected from the group consisting of alkali metal, guanidine, and ammonium nitrate, picrate, and perchlorate and mixtures thereof; nitrated hydrocarbons; nitrated polyhydric compounds; nitrated waxes; and mixtures thereof, said oxidizer being present in an amount substantially equivalent stoichiometrically to the amount of prepolymer in the mixture and constituting approximately 50% to 90% by weight of said mixture, and heating said mixture in the presence of an acid condensation catalyst, thereby forming a rocket propellant composition.

14. The process of producing a rocket propellant composition comprising the steps of forming an intimate mixture of a pentaerythritol-acrolein prepolymer resulting from the condensation of pentaerythritol and 1–2 moles of acrolein per mole of pentaerythritol in the presence of an acid condensation catalyst with finely-divided ammonium perchlorate, said ammonium perchlorate being present in an amount substantially equivalent stoichiometrically to the amount of prepolymer in the mixture and comprising approximately 70% to 90% of the mixture by weight, and heating said mixture in the presence of an acid condensation catalyst, thereby forming a rocket propellant composition.

15. The process of producing a rocket propellant composition comprising the steps of forming an intimate mixture of a pentaerythritol-acrolein prepolymer resulting from the condensation of pentaerythritol and 1–2 moles of acrolein per mole of pentaerythritol in the presence of an acid condensation catalyst, a plasticizer, and a finely-divided oxidizer, said oxidizer being present in an amount substantially equivalent stoichiometrically to the amount of prepolymer in the mixture and constituting approximately 50% to 90% by weight of the mixture, and heating said mixture in the presence of an acid condensation catalyst, thereby forming a rocket propellant composition.

16. The process of producing a shaped rocket propellant grain comprising the steps of forming a mixture of a pentaerythritol-acrolein prepolymer resulting from the condensation of pentaerythritol and 1–2 moles of acrolein per mole of pentaerythritol in the presence of an acid condensation catalyst with a finely-divided oxidizer and an acid condensation catalyst, said oxidizer being present in an amount substantially equivalent stoichiometrically to the amount of prepolymer in the mixture and constituting approximately 50% to 90% by weight of the mixture, casting the mixture in a mold, and heating the cast mixture to convert said prepolymer to a solid resin.

17. The process of producing a shaped rocket propellant grain comprising the steps of forming a mixture of a pentaerythritol-acrolein prepolymer resulting from the condensation of pentaerythritol and 1–2 moles of acrolein per mole of pentaerythritol in the presence of an acid condensation catalyst with a plasticizer, a finely-divided oxidizer, and an acid condensation catalyst, said oxidizer being present in an amount substantially equivalent stoichiometrically to the amount of prepolymer in the mixture and constituting approximately 50% to 90% by weight of the mixture, casting the mixture in a mold, and heating the cast mixture to convert said prepolymer to a solid resin.

18. The process of producing a shaped rocket propellant grain comprising the steps of forming a mixture of pentaerythritol-acrolein prepolymer resulting from the condensation of pentaerythritol and 1–2 moles of acrolein per mole of pentaerythritol in the presence of an acid condensation catalyst, a plasticizer, a finely-divided oxidizer, and an acid catalyst, said oxidizer being selected from the group consisting of alkali metal, guanidine, and ammonium nitrate, picrate, and perchlorate and mixtures thereof; nitrated hydrocarbons; nitrated polyhydric compounds; nitrated waxes; and mixtures thereof, said oxidizer being present in an amount substantially equivalent to the amount of prepolymer in the mixture and being present in the amount of 50% to 95% based on the weight of the mixture and said plasticizer being present in the amount of 5% to 30% based on the weight of the prepolymer, casting the cast mixture in a mold, and heating the cast mixture to convert said prepolymer to a solid resin.

19. The process of producing a shaped rocket propellant grain comprising the steps of forming a mixture of pentaerythritol-acrolein prepolymer resulting from the condensation of pentaerythritol and 1–2 moles of acrolein per mole of pentaerythritol in the presence of an acid condensation catalyst with ethylene glycol, ammonium perchlorate, and p-toluenesulfonic acid, the prepolymer being present in the mixture in the amount of 9% to 25% by weight, the ammonium perchlorate being present in the mixture in the amount of 70% to 90% by weight and the ethylene glycol in the amount of 0.5% to 5% by weight, casting the mixture in a mold, and heating the cast mixture to convert said prepolymer to a solid resin.

20. The process of producing a shaped rocket propellant grain comprising the following steps: reacting pentaerythritol with 1–2 moles of acrolein per mole of pentaerythritol in the presence of an acidic catalyst to form an aqueous solution of pentaerythritol-acrolein prepolymer containing monoallylidenepentaerythritol and diallylidenepentaerythritol; treating the solution with an alkaline material to neutralize the acidic catalyst; dehydrating the neutralized aqueous solution to form substantially anhydrous pentaerythritol-acrolein prepolymer; forming a mixture of said prepolymer with an oxidizer and an acid condensation catalyst, said oxidizer being present in an amount substantially equivalent stoichiometrically to the amount of prepolymer in the mixture and constituting approximately 50% to 90% by weight of the mixture; casting said mixture in a mold; and heating the cast mixture to convert said prepolymer to a solid resin.

21. The rocket propellant composition which is the cured resinous product obtained by heating in the presence of an acidic condensation catalyst a mixture of a pentaerythritol-acrolein prepolymer resulting from the condensation of pentaerythritol and 1–2 moles of acrolein per mole of pentaerythritol in the presence of an acid condensation catalyst, a polysulfide, and an oxidizer selected from the group consisting of alkali metal, guanidine, and ammonium nitrate, picrate, and perchlorate and mixtures thereof; nitrated hydrocarbons; nitrated polyhydric compounds; nitrated waxes; and mixtures thereof, said oxidizer constituting approximately 50% to 95% by weight of the mixture and being present in an amount substantially equivalent stoichometrically to the amount of prepolymer in the mixture.

References Cited by the Examiner
UNITED STATES PATENTS 2,530,493   11/1950   Van Loenen.
2,622,277   12/1952   Bonell et al.
2,855,372   10/1959   Jenkins et al.

OTHER REFERENCES

Noland: Chemical Engineering, vol. 65, No. 10, May 19, 1958, pages 153–156.

Zaehringer: Chemical Engineering Progress, vol. 51, No. 7, July 1955, page 302.

Zaehringer: "Solid Propellant Rockets, Second Stage," American Rocket Co., Box 1112, Wyandotte, Michigan (1958), pages 209–219, references pp. 225–227.

CARL D. QUARFORTH, *Primary Examiner.*

LEON D. ROSDOL, ROGER L. CAMPBELL,
*Examiners.*